(12) United States Patent
Ette

(10) Patent No.: US 12,115,935 B2
(45) Date of Patent: Oct. 15, 2024

(54) MODULE FOR WIRELESS AUTHENTICATION OF A USER FOR A KEYLESS ENTRY SYSTEM IN A TRANSPORTATION VEHICLE

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 58 days.

(21) Appl. No.: 18/310,063

(22) Filed: May 1, 2023

(65) Prior Publication Data

US 2023/0347847 A1 Nov. 2, 2023

(30) Foreign Application Priority Data

Apr. 29, 2022 (DE) ...................... 10 2022 204 232.8

(51) Int. Cl.
*B60R 25/24* (2013.01)
*B60R 25/01* (2013.01)
*B60R 25/20* (2013.01)
*G01S 13/02* (2006.01)
*G01S 13/08* (2006.01)
*G07C 9/00* (2020.01)

(52) U.S. Cl.
CPC ............ *B60R 25/245* (2013.01); *B60R 25/01* (2013.01); *B60R 25/2045* (2013.01); *G01S 13/0209* (2013.01); *G01S 13/08* (2013.01); *G07C 9/00309* (2013.01); *B60R 2325/101* (2013.01); *B60R 2325/103* (2013.01); *B60R 2325/205* (2013.01); *G07C 2009/00793* (2013.01); *G07C 2009/00984* (2013.01); *G07C 2209/63* (2013.01)

(58) Field of Classification Search
CPC ........ B60R 2325/101; B60R 2325/103; B60R 2325/205; B60R 25/01; B60R 25/2045; B60R 25/245; G01S 13/0209; G01S 13/08; G07C 2009/00746; G07C 2009/00769; G07C 2009/00793; G07C 2009/00984; G07C 2209/63; G07C 9/00309; G07C 9/00944
See application file for complete search history.

(56) References Cited

U.S. PATENT DOCUMENTS

| 6,150,926 | A | 11/2000 | Flick |
| 8,947,202 | B2 | 2/2015 | Tucker et al. |
| 10,235,820 | B2 | 3/2019 | Bartels |

(Continued)

FOREIGN PATENT DOCUMENTS

| DE | 19515549 C1 | 8/1996 |
| DE | 102016007410 A1 | 12/2016 |

(Continued)

*Primary Examiner* — Omer S Khan
(74) *Attorney, Agent, or Firm* — Barnes & Thornburg LLP

(57) ABSTRACT

A wireless interface for detecting an authorized access of a user to a keyless access system of a transportation vehicle. The part of the wireless interface provided for the wireless communication is detachably connected to the part of the wireless interface containing the electronics to improve the diversity of installation and mounting of the wireless interface.

16 Claims, 1 Drawing Sheet

(56) References Cited

U.S. PATENT DOCUMENTS

| | | | |
|---|---|---|---|
| 10,311,661 | B2 | 6/2019 | Menard et al. |
| 10,343,650 | B1 | 7/2019 | Ahmad |
| 10,343,651 | B2 | 7/2019 | Hermann |
| 10,479,321 | B2 | 11/2019 | Ette |
| 10,857,976 | B2 | 12/2020 | Kusumoto et al. |
| 2008/0168403 | A1* | 7/2008 | Westerman ........... G06F 3/0488 715/863 |
| 2014/0125552 | A1 | 5/2014 | Takisawa et al. |
| 2014/0285320 | A1 | 9/2014 | Blackmer et al. |
| 2015/0221146 | A1 | 8/2015 | Teda |
| 2020/0346618 | A1* | 11/2020 | Steegmann ........ G07C 9/00309 |
| 2020/0406860 | A1* | 12/2020 | Mai ........................ B60R 25/31 |
| 2022/0063647 | A1* | 3/2022 | Caron ................. G06F 3/04886 |

FOREIGN PATENT DOCUMENTS

| | | |
|---|---|---|
| EP | 2782075 A2 | 9/2014 |
| EP | 3501916 A1 | 6/2019 |
| GB | 2300309 A | 10/1996 |
| JP | 2002094320 A | 3/2002 |
| JP | 2009060374 A | 3/2009 |
| JP | 2014093623 A | 5/2014 |
| JP | 2018091071 A | 6/2018 |
| JP | 2019519752 A | 7/2019 |
| WO | 2021039830 A1 | 3/2021 |
| WO | 2021218993 A1 | 11/2021 |

* cited by examiner

MODULE FOR WIRELESS AUTHENTICATION OF A USER FOR A KEYLESS ENTRY SYSTEM IN A TRANSPORTATION VEHICLE

PRIORITY CLAIM

This patent application claims priority to German Patent Application No. 10 2022 204 232.8, filed 29 Apr. 2022, the disclosure of which is incorporated herein by reference in its entirety.

SUMMARY

Illustrative embodiments relate to a module for wireless authentication of a user for a keyless access system of a transportation vehicle. In addition, illustrative embodiments relate to a transportation vehicle, including the module, having a keyless access system. Modern transportation vehicles include a large number of electronic systems which are directed to a wireless interaction of the user with the transportation vehicle. For example, solutions are known which enable a keyless access to a transportation vehicle. By way of a wireless communication between a wireless interface located in the transportation vehicle and, for example, a mobile terminal of the user, the user can lock or unlock the central locking system of the transportation vehicle via input into the mobile terminal. To establish whether the user is authorized to access the access system of the transportation vehicle, an authentication of the user by an electronic system of the transportation vehicle is required.

BRIEF DESCRIPTION OF THE DRAWINGS

The disclosed embodiments are explained based on the associated drawings. In the figures.

DETAILED DESCRIPTION

Figure 1:
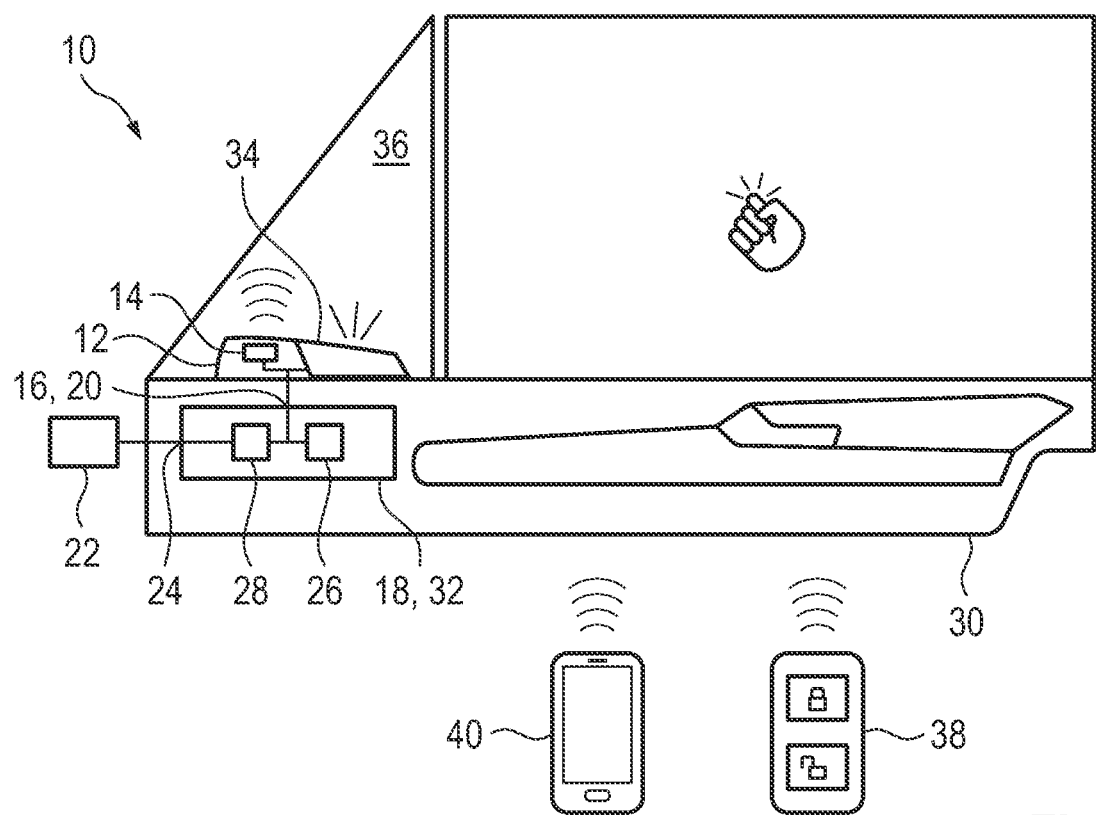
FIG. 1 shows a schematic illustration of the interior view of a vehicle door of a transportation vehicle having a disclosed module according to an exemplary embodiment.

A solution is proposed in U.S. Pat. No. 10,343,650 B 1, in which an authentication module connected to the central locking system is installed in the vehicle door, which can wirelessly detect a terminal of the user by using an NFC interface. The user is authenticated by comparison of biometric data stored in the memory of the authentication module and the biometric data transmitted from the terminal of the user. After completed authentication, the authentication module automatically unlocks the central locking system of the transportation vehicle.

Further examples of relevant prior art are disclosed in documents DE 10 2016 007 410 A1, WO 2021/039830 A1, U.S. Pat. No. 6,150,926 A, EP 3 501 916 A1, DE 195 15 549 C1, and EP 2 782 075 A2.

The known solutions have the problem that the wireless interfaces for detecting an authorized access of a user are required at the operating point of the transportation vehicle, thus in a vehicle door or hatch, due to which the installation effort and the costs of the transportation vehicle are increased.

Disclosed embodiments provide a more cost-effective wireless interface for authenticating a user for a keyless access system of a transportation vehicle.

This is achieved by a module for wireless authentication of a user for a keyless access system of a transportation vehicle and a transportation vehicle including the module.

A first exemplary embodiment relates to a module for wireless authentication of a user for a keyless access system of a transportation vehicle, in particular, of a passenger vehicle having an internal combustion engine, electric motor, or hybrid motor. The module contains a first section including an antenna configured for transmitting and receiving radio signals and a first interface for transferring the transmitted or received radio signals. In other words, the first section comprises a wireless interface, which can assume the function of receiving and transmitting wireless radio signals with other terminals and can provide the received or transmitted radio signals via the first interface.

The module furthermore comprises a second section detachably connected to the first section. Detachably means that the sections can be detached from one another again without damage. In view of the disclosure, however, detachable can also comprise conditionally detachable connections, such as adhesive bonds or rivet connections. A connection is conditionally detachable if only auxiliary joining parts have to be destroyed to detach the connection. In other words, the two sections can be understood as two units physically separable from one another. The simplification of the mounting of the disclosed module upon installation at the usage location is particularly beneficial in the disclosed solution. The diversity of installation and mounting is increased by the detachable separation of the two sections of the module. For example, the module can be mounted in a transportation vehicle in installation operations separate from one another. It is thus possible that the first section of the module is installed in a first vehicle component and the second section of the module is installed in another vehicle component and the connection of the two sections takes place after the installation or assembly of the two vehicle components. The behavior is similar in the retrofitting of existing transportation vehicles, in which the later installation of the module is facilitated. The physical embodiment of the two sections is adaptable in each case per se variably to the usage location, for example, to various transportation vehicle models and types.

A further exemplary embodiment which results from the detachable connection of the two sections of the module is that the first section can be arranged on or in a vehicle component which is not surrounded or shielded by a shielding material, for example, a metal construction of the transportation vehicle. The range and functionality of the antenna of the disclosed module can insofar be significantly improved.

The second section includes a second interface configured for connection to the first interface. The first interface and the second interface are configured in such a way that their connection is a mechanical connection. In addition, their connection may furthermore be a connection configured for data transfer. The mechanical connection can be configured to connect the first section and the second section in a friction-locked or formfitting way. The mechanical connection can therefore be embodied by fastening methods or mechanisms for fastening the first section of the module on the second section of the module. A mechanical connection is, for example, a screw, plug-in, adhesively bonded, or rivet connection. Mechanical connections have the benefit that the first section is fixedly connected to the second section, so that the first section does not have to be fastened independently on a vehicle component, but rather is indirectly fastened by fastening the second section on a vehicle component.

The second section furthermore includes a third interface connected to an access system for locking or unlocking a vehicle door and a control device connected to the second interface and the third interface. The third interface can, for example, be configured for communication with a data bus, such as CAN, or can be an Ethernet interface. These are common interfaces in transportation vehicle technology, so that the module can be installed or retrofitted in existing transportation vehicles. The control device is configured to activate the antenna via the first interface connected to the second interface and to carry out a positioning method, based on time-of-flight measurements, using the antenna.

Positioning methods based on time-of-flight measurements have the benefit over conventional positioning methods based on field strength measurements that they are less susceptible to relay station attacks (RSA) on keyless vehicle access systems, in which an attacker positions one or more radio amplifiers between transportation vehicle and key and thus increases the transmission power of the radio signals emitted by the key and detected by the transportation vehicle. On the basis of the conventional field strength measurement, the transportation vehicle thus incorrectly locates the key at a position closer than its real position and enables opening. RSA attacks thus enable the transportation vehicle of a user to be opened even when he is located outside the normal range of the keyless access system, for example, in a café or his apartment, and believes his transportation vehicle to be securely locked.

As a measure against this attack, the disclosed module uses a positioning method based on time-of-flight measurements as a so-called "relay station attack defense" technology, abbreviated RSAD. In such a time-of-flight measurement (ToF), essentially a first radio signal is transmitted by the control device via the antenna of the module to a transceiver of a mobile terminal or a vehicle key. After a certain processing time, a second radio signal is transmitted back to the module by the mobile terminal or the vehicle key.

On the basis of this time between the transmission of the first radio signal and the reception of the second radio signal $t2-t1$, reduced by the processing time $\Delta tVB$, the distance d between the antenna of the module and the mobile terminal or the vehicle key can be ascertained on the basis of the propagation speed of the radio signals, i.e., the speed of light, according to $d=((t2-t1)-\Delta tVB/2c)$. The use of radio signals having high time resolution enables a position resolution of significantly less than a meter.

The control device is furthermore configured to transmit a signal based on a result of the positioning method via the third interface to the access system. The result is at least a distance between the transportation vehicle and the mobile terminal or the vehicle key, in particular, insofar as the disclosed module only receives or transmits radio signals via an antenna. If the module comprises multiple antennas or the control device of the disclosed module receives additional radio signals from other antennas, for example, antennas of other electronic systems contained in the transportation vehicle, a bearing (triangulation) of the mobile terminal or the vehicle key and its relative location to the module is determined by the time-of-flight measurements. The control device of the module can therefore be configured to determine a bearing (triangulation) of the mobile terminal or the vehicle key and its relative location to the module by the time-of-flight measurements.

Knowing the location of the module, for example, via GPS, the absolute location of the mobile terminal or the vehicle key is therefore also ascertainable. The control device may be designed to carry out an authentication of the user on the basis of the distance of the key, particularly also on the basis of the relative or absolute location of the mobile terminal or the vehicle key, and to ascertain whether unlocking or locking of the transportation vehicle is to take place via the keyless access system. An authentication of the user particularly takes place when the distance between the mobile terminal or the vehicle key and the module falls below a predetermined limiting value. In this case, the transportation vehicle may be unlocked or locked when the user thus authenticated transmits a command signal via the disclosed module to the keyless access system of the transportation vehicle. The command signal can be produced, for example, via the mobile terminal, the vehicle key, and/or a detected touch of the user, for example, a knocking gesture. The disclosed authentication of the user prevents unauthorized users from being able to acquire access to the transportation vehicle. The command signal furthermore prevents inadvertent opening of the transportation vehicle.

In at least one disclosed embodiment, it is provided that the control device is configured for transmitting and receiving ultra-wide band (UWB) pulses via the antenna. In particular, the control device and the antenna are designed for transmitting and receiving UWB pulses in very large frequency ranges, in particular, in a frequency range from 3.1 to 10.6 GHz, optionally in a frequency range from 3.5 to 9 GHz, particularly in a frequency range from 6 GHz to 8.5 GHz. The transmission power of the UWB pulses is low. Their bandwidth is at least 500 MHz.

The control device may be designed for transmitting and receiving radio signals via the antenna at a transmission power between 0.5 mW/−41.3 dBm/MHz. Furthermore, the control device may be configured for transmitting and receiving radio signals via the antenna according to the standard IEEE 802.15.4 (in particular, the sections on the UWB PHY layer) and optionally according to the standard IEEE 802.15.4z. Due to the scattering of the signals over such large frequency ranges, UWB signals only minimally interfere with other radio signals. Furthermore, transmission pulses strongly localized with respect to time and having low full width at half maximum (FWHM) can be transmitted by using UWB transceivers. This is based on the high frequency breadth of the transmission pulses ($\Delta E^*\Delta t>$const.). UWB signals are thus particularly suitable for time-resolved time-of-flight measurements and enable positioning with very high location resolution.

In a further disclosed embodiment, it is provided that the control device is configured for transmitting and receiving BLUETOOTH® pulses via the antenna. In particular, the control device and the antenna are configured for transmitting and receiving BLUETOOTH® pulses, particularly BLUETOOTH® low energy pulses, in the 2.4-GHz ISM band (2400 to 2483.5 MHz). BLUETOOTH® signals are suitable for time-resolved time-of-flight measurements, thus for a positioning method based on time-of-flight measurements. Above all the radio technology BLUETOOTH® low energy offers benefits with respect to the power consumption and the costs.

It is possible to ascertain the position of a mobile terminal and/or a vehicle key at a distance of 0.1 m to 1.5 m from the antenna both via UWB pulses and via BLUETOOTH® pulses.

In a further disclosed embodiment, it is provided that the control device is configured for transmitting and receiving UWB pulses and BLUETOOTH® pulses via the antenna. A further antenna configured for transmitting and receiving radio signals may be provided in the first section of the module, wherein the control device is configured to activate the further antenna via the first interface connected to the second interface. It is therefore possible to transmit and receive UWB pulses via the one antenna and BLUETOOTH® pulses via the other antenna by the control device to carry out a positioning method based on time-of-flight measurements using both the UWB pulses and the BLUETOOTH® pulses. The combination of both radio technologies improves the reliability of the positioning method. The redundancy which results from the combination of both radio technologies can additionally lengthen the usage service life of the module insofar as a (technical) failure of one of the two radio technologies does not result in a function loss of the module, since the respective other radio technology takes over the function of the position ascertainment. In other words, the user of the transportation vehicle can, under certain circumstances, not perceive at all that one of the two radio technologies fails, since the keyless access system of the transportation vehicle is still operable via the disclosed module.

The control device may furthermore be configured for transmitting and receiving near field communication (NFC) radio signals via the antenna. In particular, the antenna is configured for transmitting and receiving NFC radio signals. The NFC radio technology enables a wireless communication of the module with a mobile terminal or a vehicle key by using NFC radio signals for operation of the keyless access system of the transportation vehicle by the user. The range of this radio technology is typically limited to a few centimeters.

The control device may comprise a first control device and a second control device, which are arranged on a circuit board. The first control device comprises an integrated circuit (IC) for activating the antenna. The integrated circuit may be configured to activate the antenna via the first interface connected to the second interface. Furthermore, the integrated circuit may be configured to receive and transmit UWB pulses, BLUETOOTH® pulses, and/or NFC radio signals via the antenna, optionally also additionally via further antennas. In other words, the integrated circuit is used as a driver for the antenna of the module or for a plurality of antennas, which are contained in the first section of the module and/or in an electronic system of the transportation vehicle.

The second control device can comprise a microcontroller or microprocessor, which is configured to carry out the positioning method based on time-of-flight measurements using the integrated circuit of the first control device and the antenna and to transmit the signal via the third interface to the access system based on a result of the positioning method. In other words, the second control device is used as a functional computation unit, which evaluates the data received from the first control device and the antenna or the plurality of antennas for authentication of the user and transmits the signal for locking or unlocking the transportation vehicle to the access system. The transmission may take place in reaction to an input, for example, a knock signal or a keypress, of an authenticated user. However, this input is also alternatively evaluated by a controller of the access system.

In a likewise disclosed embodiment, the first section of the module comprises a display, an alphanumeric display, or an LED. The control device may be configured to activate the display, the alphanumeric display, or the LED via an interface, optionally via the first interface of the module connected to the second interface. The activation can take place in such a way that items of information with respect to the functions of the module or the transportation vehicle are communicated visually to the user.

In a likewise disclosed embodiment, the first section of the module comprises a transparent carrier. A carrier is transparent when it is transmissive to light having wavelengths in the visible range of the human eye, for example, from 400 nm to 800 nm. The carrier may be partially or completely transparent. Due to the use of a transparent or partially transparent carrier, the first section of the module can be arranged, for example, in or on transparent materials, for example, transparent vehicle components, without significantly impairing the view through the transparent material. The diversity of mounting and installation of the disclosed module is increased. In addition, the range and functionality of the antenna of the disclosed module are significantly improved, since no shielding material, such as a metal construction of the transportation vehicle, impairs the wireless connection between antenna and mobile terminal or vehicle key.

In a likewise disclosed embodiment, the first section of the module is formed as a part of a vehicle window of a transportation vehicle, to which the antenna is applied. The antenna may be vapor deposited on the vehicle window, particularly directly vapor deposited. This is an example of a simple and cost-effective mounting of the first section in or on a vehicle component. The antenna can, for example, be applied, in particular, vapor deposited, on the vehicle component before installation of the vehicle component and the first section can be connected to the second section only after the installation of the vehicle component. Costs can insofar be saved due to the facilitated mounting of the disclosed module in a transportation vehicle.

The second section of the module may include a fastening section configured for fastening on a vehicle component of a transportation vehicle. The fastening section can comprise formfitting and/or friction-locked fastening methods or mechanisms, which are configured to fasten the second section of the module on the vehicle component of the transportation vehicle. Due to the detachable connection between the first and the second section, the second section can be fastened as such during the mounting via the fastening section on a vehicle component and only detachably connected to the first section in a later installation operation or subsequently. The mounting of the module in the transportation vehicle thus facilitated results in cost savings.

In a likewise disclosed embodiment, the module furthermore comprises an acceleration sensor. The control device may be configured to detect knocking gestures for operating the access system from sensor data of the acceleration sensor. Knocking gestures are, for example, predetermined chronological sequences of knocking signals. These can be stored in a memory unit of the control device. If a signal sequence detected by the control device via the acceleration sensor corresponds to a signal sequence stored in the memory, the control device can thus understand this as a knocking gesture for operating the access system. In conjunction with a successful authentication of the user, thus based on the result of the positioning method, the control device can transmit the signal via the third interface to the access system to lock or unlock the transportation vehicle. Additionally or alternatively, the control device can be configured to block the access of a user to the access system based on the data of the acceleration sensor. This is used as an additional antitheft protection.

Additionally or alternatively, the control device can be configured to activate the antenna for wireless data communication with a transceiver of an electronic radio key and/or a mobile terminal. The wireless data communication can be used to receive operating instructions, transmitted by the user via the transceiver of the electronic radio key and/or the mobile terminal, for the access system via the antenna. In conjunction with a successful authentication of the user, thus based on the result of the positioning method, the control device can transmit the signal via the third interface to the access system to lock or unlock the transportation vehicle according to the operating instruction of the user.

A further exemplary embodiment relates to a transportation vehicle, in particular, a transportation vehicle having an internal combustion engine, electric motor, or hybrid motor, which comprises a keyless access system for electronically controlled locking and unlocking of at least one vehicle door of the transportation vehicle and the disclosed module for wireless authentication of a user for the keyless access system of the transportation vehicle. The access system may include a central locking system, particularly an electrically actuated central locking system, which is designed for unlocking and locking the locks of the at least one vehicle door. The keyless access system may be designed to only open certain vehicle doors, for example, a driver door or a rear hatch, or an engine hood or a fuel tank flap. Alternatively, the access system is designed to open all vehicle doors of the transportation vehicle, the engine hood, and/or the fuel tank flap simultaneously.

The keyless vehicle access system enables the user to wirelessly open and lock the transportation vehicle, while the disclosed module authenticates the user by a positioning method based on time-of-flight measurements and only passes on operating instructions from authenticated users for the access system to the access system.

The first section of the disclosed module may be arranged on or in a sliding window, a fixed window, or a rear hatch, also optionally in a windowpane arranged in the rear hatch, of the transportation vehicle. In other words, the first section of the module may be arranged at an externally visible point of the transportation vehicle. This arrangement of the first section of the module in the transportation vehicle prevents the antenna from being shielded by the metal construction of the transportation vehicle. The range and the functionality of the antenna of the disclosed module are therefore significantly improved.

The antenna is particularly applied, optionally directly applied, to the sliding window, the fixed window, or the rear hatch, optionally the windowpane arranged in the rear hatch, of the transportation vehicle. The cost benefits already described in conjunction with the module due to the facilitated mounting of the disclosed module in the transportation vehicle are achieved in this way.

The second section of the module may be arranged in or behind an inner panel of the transportation vehicle, in particular, a door inner panel. Due to this arrangement of the second section of the module, the module is protected by the inner panel of the transportation vehicle from mechanical and weather-related influences due to nature and user. In addition, the second section of the module is protected by such an arrangement, thus an arrangement of the module in the interior of the transportation vehicle, from an access by an unauthorized party.

Furthermore, a module is disclosed for electronically processing a wireless authentication of a user for a keyless access system of a transportation vehicle. The module for electronic processing contains a first control device connected to an antenna interface, which is configured to activate an external antenna configured for transmitting and receiving radio signals via the antenna interface. The antenna interface may be configured for data transfer and/or for the purpose of establishing a mechanical connection to the external antenna and/or a carrier including the external antenna. The mechanical connection may take place in a friction-locked or formfitting way. The antenna interface may be configured to establish the mechanical connection by fastening methods or mechanisms for fastening the external antenna and/or the carrier including the external antenna. A mechanical connection is, for example, a screw, plug-in, adhesively bonded, or rivet connection. The mechanical connection of the antenna interface has the benefit that the antenna does not have to be fastened independently on a transportation vehicle component, but rather is fastened indirectly on, for example, a vehicle component by the mechanical connection to the module for electronic processing.

The module for electronic processing furthermore contains a vehicle interface connected to an access system for locking or unlocking a vehicle door and a second control device, connected to the first control device, which is configured to carry out a positioning method based on time-of-flight measurements using the first control device and the external antenna and, based on a result of the positioning method, to transmit a signal via the vehicle interface to the access system.

In addition, the module for electronic processing comprises a fastening section configured for fastening on a vehicle component.

In other words, the module for electronic processing of a wireless authentication of a user for a keyless access system of a transportation vehicle corresponds to the above-described second section of the module for wireless authentication of a user for a keyless access system of a transportation vehicle having a fastening section configured for fastening on a vehicle component. Reference is insofar made with regard to the description of the benefits and effects to the description of the disclosed module for wireless authentication of a user for a keyless access system of a transportation vehicle and a renewed description is omitted.

Further exemplary embodiments result from the remaining features mentioned in the dependent claims.

The various exemplary embodiments mentioned in this application, if not stated otherwise in the individual case, may be combinable with one another.

FIG. 1 shows a schematic illustration of the interior view of a vehicle door 30 of a transportation vehicle 42 according to at least one exemplary embodiment of the module 10. The transportation vehicle 42 includes a keyless access system 22, which is configured for controlling the transportation vehicle 42, in particular, for unlocking and locking at least one vehicle door 30.

The disclosed module 10 is suitable for the wireless authentication of a user for the keyless access system 22 of the transportation vehicle 42. The module 10 includes a first section 12 having an antenna 14 configured for transmitting and receiving radio signals. A first control device 26 and a second control device 28 are provided on a circuit board 32 in a second section 18 detachably connected to the first section 12.

The first control device 26 and the second control device 28 are connected via a first interface 16 of the first section 12 and a second interface 20 of the second section 18 to the antenna 14. The first control device 26 is used to activate the antenna 14 via the first interface 16 connected to the second interface 20. To authenticate a user, the second control device 28 carries out a positioning method based on time-of-flight measurements using the first control device 26 and the antenna 14. The distance of a radio key 38 or a mobile terminal 40 of the user is ascertained by the positioning method, by using UWB or BLUETOOTH® low energy radio technology.

For this purpose, the antenna 14 transmits, under the control of the first control device 26 and the second control device 28, a first UWP pulse at a point in time t1 to the radio key 38 or the mobile terminal 40 of the user. In reaction, the second control device 28 receives a second UWB pulse from the radio key 38 or the mobile terminal 40 of the user via the antenna 14 at a point in time t2. Based on these times and possibly further items of information stored in a memory (not shown) of the second control device 28, for example, on a processing time ΔtVB of the first UWP pulse in the radio key 38 or in the mobile terminal 40 of the user, a distance of the antenna 14 to the radio key 38 or the mobile terminal 40 of the user is computed by the second control device 28. If the distance thus ascertained falls below a limiting value stored in the memory, the user is authenticated by the second control device 28. The user thus authorized can now operate the access system 22 via the disclosed module 10. For this purpose, he emits an operating signal by using input in the radio key 38 or in the mobile terminal 40, which is received via the antenna 14 of the module. Since the user is authenticated, the second control device 28 transmits a signal via a third interface 24 to the access system 22 to lock or unlock the transportation vehicle according to the input of the user.

Moreover, the module 10 comprises an acceleration sensor (not shown), which is connected to the second control device 28. Predetermined chronological sequences of knocking signals are stored in the memory of the second control device 28. This enables the user to actuate one of the predetermined chronological sequences by knocking on the windowpane, for example (indicated by the first symbol in FIG. 1), which is detected by the second control device 28 as an operating signal for unlocking or locking the access system 22. After completed authentication of the user by the positioning method based on time-of-flight measurements, the second control device 28 transmits the signal for unlocking or locking to the access system 22. Visual feedback for confirming or denying the received operating signal is displayed by a display 34 in the first section 12 of the module. For this purpose, the second control device 28 is connected to the display 34 and is configured to activate the display 34.

With regard to the exemplary embodiment shown in FIG. 1, it is apparent that the first section 12 of the disclosed module 10 is arranged on the inside of a vehicle window 36. Due to the arrangement of the first section 12 above the metal construction of the vehicle door 30, the radio signals transmitted and received by the antenna 14 are not shielded. The range and functionality of the antenna 14 of the disclosed module 10 are therefore significantly improved in comparison to an arrangement inside the vehicle door 30. In addition, the display 34 arranged in the first section 12 enables the visual transmission of items of information to the user.

The second section 18 of the disclosed module 10 is arranged between the vehicle door 30 and the door inner panel. Contrary to the embodiment shown in FIG. 2, the second section 18 of the module 10 is thus located behind the door inner panel of the vehicle door 30, from the perspective of the vehicle interior. Accordingly, the sensitive control electronics unit 20, 24, 26, 28 arranged in the second section 18 of the module 10 is protected from mechanical and weather-related influences by nature and user.

Figure 2:
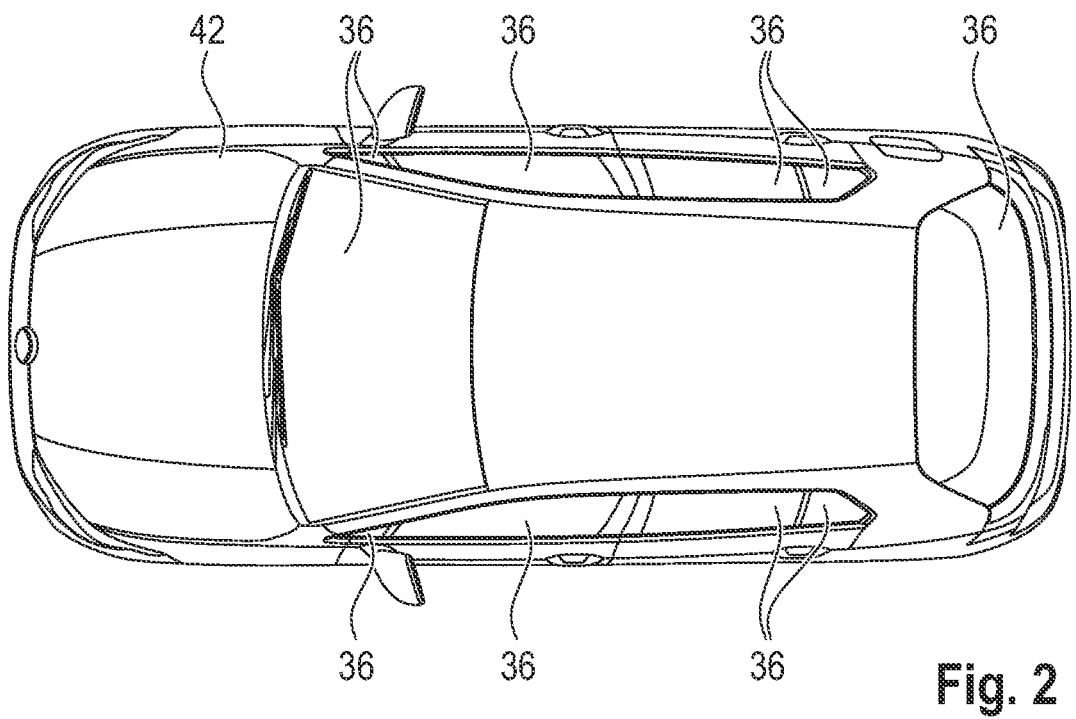
FIG. 2 shows a schematic illustration of a transportation vehicle.

FIG. 2 shows a schematic illustration of a typical transportation vehicle 42. Although the first section 12 of the module 10 is arranged on a vehicle window 36 designed as a trapezoidal window, it is clear when looking at FIG. 2 that the benefits of the disclosed module 10 can be implemented on all vehicle windows 36 of the transportation vehicle 42. In other words, the disclosed module 10 can be arranged on or in a sliding window or a fixed window. The windshield or the windowpane of the transportation vehicle 52 arranged in the rear hatch are also provided as possible usage locations.

LIST OF REFERENCE NUMERALS 10 module for wireless authentication of a user
12 first section
14 antenna
16 first interface
18 second section
20 second interface
22 keyless access system
24 third interface
26 first control device
28 second control device
30 vehicle door
32 circuit board
34 display
36 vehicle window
38 radio key
40 mobile terminal
42 transportation vehicle

The invention claimed is:

1. A module for wireless authentication of a user for a keyless access system of a transportation vehicle, the module containing:
   a first section including an antenna for transmitting and receiving radio signals and a first communication interface for transferring the transmitted or received radio signals; and
   a second section detachably connected to the first section, the second section comprising:
      a second communication interface for connection to the first communication interface,
      a third communication interface connected to an access system for locking or unlocking a vehicle door,
      an acceleration sensor; and
      a control device connected to the second communication interface and the third communication interface, which is configured to:
   activate the antenna via the first communication interface connected to the second communication interface,
      carry out a positioning method, based on time-of-flight measurements, using the antenna,
      wherein the first communication interface and the second communication interface are mechanically fixedly connectable to one another, so that the first section is indirectly fastenable by fastening the second section on a vehicle component,
      wherein the first section of the module is formed as a part of a vehicle window of a transportation vehicle to which the antenna is applied,
      wherein the control device detects knocking gestures for operating the access system from sensor data of the acceleration sensor,
      wherein the knocking gestures are predetermined chronological sequences of stored in a memory of the control device, determine if a knocking gesture sequence detected by the control device via the acceleration sensor matches with a knocking gesture sequence stored in the memory, the control device authenticates the user, and transmit a signal based on a result of the positioning method and the matching of the knocking gesture sequence via the third communication interface to the access system to lock or unlock the transportation vehicle.

2. The module of claim 1, wherein the control device transmits and receives UWB pulses and/or in the 2.4-GHz ISM band pulses via the antenna.

3. The module of claim 1, wherein the control device transmits and receives NFC radio signals via the antenna.

4. The module of claim 1, wherein the control device comprises a first control device and a second control device arranged on a circuit board, wherein the first control device comprises an integrated circuit for activating the antenna and wherein the second control device comprises a microcontroller or microprocessor to carry out the positioning method based on time-of-flight measurements using the integrated circuit of the first control device and the antenna and, based on a result of the positioning method, to transmit the signal via the third communication interface to the access system.

5. The module of claim 1, wherein the first section of the module comprises a display, an alphanumeric display, or an LED.

6. The module of claim 1, wherein the first section of the module comprises a transparent carrier.

7. The module of claim 1, wherein the second section of the module comprises a fastening section for fastening on a vehicle component of a transportation vehicle.

8. The module of claim 1, wherein the control device activates the antenna for wireless data communication with a transceiver of an electronic radio key and/or a mobile terminal.

9. A transportation vehicle comprising:
a keyless access system for electronically controlled locking and unlocking of at least one vehicle door of the transportation vehicle; and
a module for wireless authentication of a user for a keyless access system of a transportation vehicle, the module containing:
a first section including an antenna for transmitting and receiving radio signals and a first communication interface for transferring the transmitted or received radio signals; and
a second section detachably connected to the first section, the second section comprising:
a second communication interface for connection to the first communication interface,
a third communication interface connected to an access system for locking or unlocking a vehicle door,
an acceleration sensor; and
a control device connected to the second communication interface and the third communication interface, which is configured to:
activate the antenna via the first communication interface connected to the second communication interface, carry out a positioning method, based on time-of-flight measurements, using the antenna, wherein the first communication interface and the second communication interface are mechanically fixedly connectable to one another, so that the first section is indirectly fastenable by fastening the second section on a vehicle component,
wherein the first section of the module is formed as a part of a vehicle window of a transportation vehicle to which the antenna is applied,
wherein the control device detects knocking gestures for operating the access system from sensor data of the acceleration sensor,
wherein the knocking gestures are predetermined chronological sequences of stored in a memory of the control device, determine if a knocking gesture sequence detected by the control device via the acceleration sensor matches with a knocking gesture sequence stored in the memory, the control device authenticates the user, and
transmit a signal based on a result of the positioning method and the matching of the knocking gesture sequence via the third communication interface to the access system to lock or unlock the transportation vehicle.

10. The transportation vehicle of claim 9, wherein the vehicle window in which the first section of the module is formed is a sliding window, a fixed window, or a rear hatch of the transportation vehicle.

11. The transportation vehicle of claim 10, wherein the antenna is applied to the sliding window, the fixed window, or the rear hatch of the transportation vehicle.

12. The transportation vehicle of claim 9, wherein the second section of the module is arranged in or behind an inner panel of the transportation vehicle.

13. A method for wireless authentication of a user for a keyless access system of a transportation vehicle, the method comprising:
transmitting and receiving radio signals via a first module section including an antenna;
transferring the transmitted or received radio signals from the first module section antenna to a first communication interface of the first module;
activating the antenna of the first module section via the first communication interface using a control device coupled to second and third communication interfaces, wherein the second communication interface is configured to connect to the first communication interface and the third communication interface is connected to an access system for locking or unlocking a vehicle door, wherein the control device and second and third communication interfaces are part of a second module section, and wherein the second module section is detachably connected to the first module section;
carry out a positioning method, under control of the control device, based on time-of-flight measurements, using the antenna,
wherein the first communication interface and the second communication interface are mechanically fixedly connectable to one another, so that the first section is indirectly fastenable by fastening the second section on a vehicle component,
wherein the first section of the module is formed as a part of a vehicle window of a transportation vehicle to which the antenna is applied,
wherein the control device detects knocking gestures for operating the access system from sensor data of the acceleration sensor,
wherein the knocking gestures are predetermined chronological sequences of stored in a memory of the control device, determine if a knocking gesture sequence detected by the control device via the acceleration sensor matches with a knocking gesture sequence stored in the memory, the control device authenticates the user, and transmitting a signal, under control of the control device, based on a result of the positioning method and the matching of the knocking gesture sequence via the third communication interface to the access system to lock or unlock the transportation vehicle.

14. The method of claim 13, wherein the control device transmits and receives UWB pulses and/or in the 2.4-GHz ISM band pulses via the antenna or transmits and receives NFC radio signals via the antenna.

15. The method of claim 13, further comprising detecting knocking gestures for operating the access system from sensor data of an acceleration sensor.

16. The method of claim 13, wherein the control device activates the antenna for wireless data communication with a transceiver of an electronic radio key and/or a mobile terminal.

* * * * *